United States Patent Office 3,517,956
Patented June 30, 1970

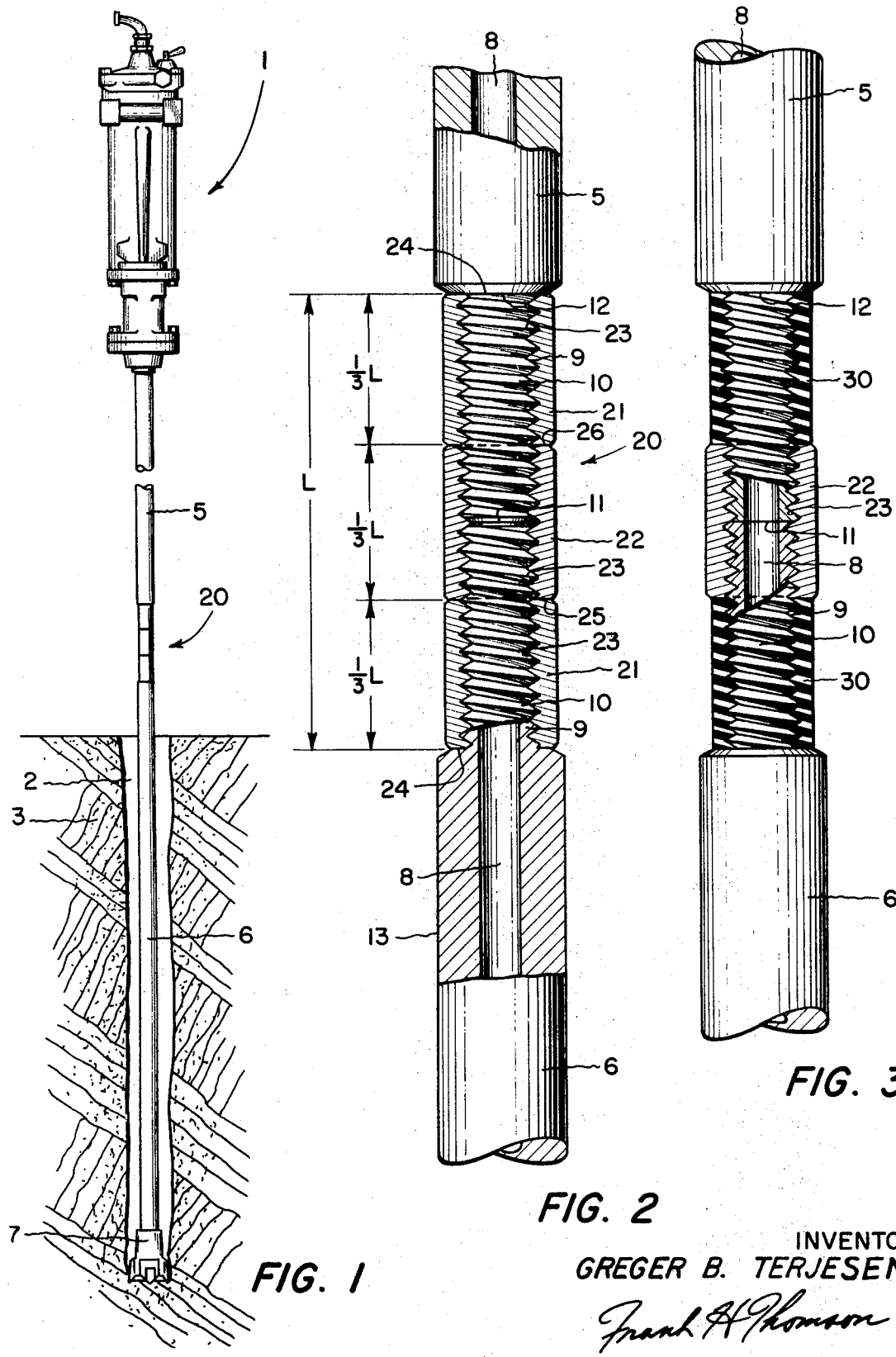

3,517,956
DRILL ROD COUPLING ARRANGEMENT
Greger B. Terjesen, Murray Hill, N.J., assignor to Ingersoll-Rand Company, New York, N.Y., a corporation of New Jersey
Filed Feb. 12, 1969, Ser. No. 798,583
Int. Cl. F16d 1/02
U.S. Cl. 287—117        7 Claims

ABSTRACT OF THE DISCLOSURE

A coupling for drill rods in which the drill rods have a threaded portion at one end. The coupling includes a pair of spacer elements. One of the spacer elements is threaded onto the threaded portion of each drill rod until it contacts a stop formed at the end of the threaded portion. A coupling member similar to the spacer elements is then threadedly secured to the threaded portion of each drill rod to join the two drill rods in coaxial alignment. The coupling member is internally threaded throughout its length and no mismatch is needed.

BACKGROUND OF THE INVENTION

In drilling holes of substantial depth, it is necessary to couple two or more drill rods together. Conventional drill rods have a threaded portion at each end. This threaded portion may terminate in a shoulder. A tubular, internally threaded coupling member is threadedly secured to the threaded end of each of the drill rods to join the two rods together. In order to prevent the drill rods from unthreading themselves from the coupling, some sort of stop must be provided. Thus, in most prior drill rods, the coupling extends the entire total length of the threaded portion on each drill rod when the rods abut each other in end to end relationship.

The disadvantage of conventional drill rods is that should the drill rod break or the threads become so worn that they can no longer be useful, the rod must be returned to the shop for rethreading. One attempt to overcome the requirement that each time breakage of a drill rod occurs, the rod has to be returned to the shop, is provided by the U.S. patent application of J. D. Ditson et al., Ser. No. 525,009, filed Jan. 11, 1966 now Pat. No. 3,424,479. In that application, the drill rod is threaded throughout its entire length. If the rod breaks or the threads at the coupling fail, all that need be done is square off the broken end. In order to prevent one of the drill rods from threading itself through the coupling and unscrewing the other rod from the coupling as the drill rod is rotated, one half of the coupling is threaded from one end and the other half of the coupling is threaded from the other end. The two threads are axially offset to provide a shoulder or stop. Manufacturing costs for such a coupling and drill rod can be high.

It has been found that most of the failure of drill rods occurs through a failure of the threads which are within the coupling. Because rod failure usually occurs at the coupling, it is not always necessary to thread the rod throughout its length in order to increase rod life without returning the rod to the shop for reconditioning.

The threads on the coupling often fail, but if this occurs, the coupling is no longer useful. With prior apparatus a single coupling element is used and when it fails, the entire coupling is no longer useful.

SUMMARY

It is therefore the principal object of this invention to provide a drill rod coupling system which has an increased life span and is capable of being reconditioned in the field.

It is another object of this invention to provide a simplified coupling system which has an increased life and is capable of being used with a conventional drill rod.

The foregoing and other objects will be carried out by providing in combination, a pair of coaxially aligned drill rods each having a threaded portion at one end, and a coupling for connecting the drill rods to each other; said coupling including a pair of spacer elements each secured to the threaded portion of one of the drill rods and a tubular coupling member having internal threads; said coupling member being threadedly secured to the threaded portion of each of said drill rods.

BRIEF DESCRIPTION OF THE DRAWING

The invention will be described in connection with the annexed drawing wherein:

FIG. 1 is generally a schematic view showing the drill rod and coupling system as it is used with a drilling machine for drilling a hole;

FIG. 2 is a sectional view of one embodiment of the coupling of the present invention; and FIG. 3 is a second embodiment of the coupling of the present invention.

DESCRIPTION OF THE PREFERRED EMBODIMENTS

In FIG. 1 there is shown a drilling machine generally indicated at 1 which will be used for drilling a hole 2 into rock or other material 3. The drill 1 is of the rotary-percussion type. A first drill rod 5 is connected to the drilling machine 1 and a second drill rod 6 is coupled to the first drill rod 5 by a coupling generally indicated at 20. In practice, a shank piece will be connected to the drill 1 and the first drill rod 5 will be coupled to this shank piece. For simplicity, the shank piece has not been shown. A drill bit 7 is connected to the drill rod 6. Although the coupling system of the present invention has been illustrated as connecting two drill rods together, it is intended that it be used for connecting a drill rod to a shank piece as well.

Referring now to FIG. 2, the drill rods 5 and 6 are substantially identical in configuration and include a bore 8 axially therethrough for conducting fluid such as air under pressure for blowing cuttings out of the hole. Each of the dirll rods 5 and 6 is provided with a reduced diameter portion 9 having threads 10 thereon. The end of the threaded portion 9 terminates in a shoulder 12 between the threaded portion and the body of the drill rod. The end 11 of the drill rods are suitably squared off so that when coupled together they will abut for transferring percussion from one drill rod to another. Although drill rods having a reduced diameter portion 9 and a shoulder 12 have been shown, it should be understood that the present invention is equally applicable to drill rods wherein the threaded end is substantially the same size or bigger than the unthreaded portion 13 either with or without a shoulder. If no shoulder is provided, some form of stop should be provided at the end of the threaded portion to prevent the rod from threading itself through the coupling.

The coupling of FIG. 2 generally indicated at 20, includes three parts; a pair of spacer elements 21 and a coupling member 22. Each of these elements are identical tubular members having threads 23 on their internal surface so that they may be threaded onto the portion 9. Each of the spacer elements 21 is secured to one of the reduced diameter portions 9 until its end 24 engages the shoulder 12. The coupling member 22 is then threaded onto each of the reduced diameter portions 9 to join the drill rods in coaxial alignment with each other so that the ends 11 abut. The ends 25 and 26 of the coupling member abut against the ends of the spacer elements 21.

With the abutment of the coupling member with the spacer elements and the spacer elements with the shoulder 12, the drill rods cannot unthread themselves from the coupling 20. If the coupling is used with drill rods which do not have a shoulder at the end of the threaded portion, the end of the thread acts as the stop which prevents the drill rod from unthreading itself from the coupling.

In the embodiment of FIG. 3 instead of using spacer elements 21 which are the same as the coupling member 22, I have shown non-metallic spacer elements 30 which may be secured to the threaded portion 9 in any manner such as by threading. The important feature is that the coupling 22 abut against the ends of the spacer elements and that the ends of the spacer elements abut against the stop 12 or friction between the spacer elements and the threaded end. As is the case in FIG. 2, the coupling member 22 is threaded continuously throughout its length and the root diameter of the thread 23 is constant throughout its length.

The use of the coupling and advantages will now be described. The length of the threaded portions 9 when the dirll rods are joined together has been designated L. This length is equal to the distance between the shoulders 12 when the ends 11 of the rods 5 and 6 abut against each other. The spacer elements 21 and coupling element 22 are identical in length thus making each ⅓ L. Most rod failure occurs on the threaded portion which is within the coupling itself; i.e. coupling member 22. When this occurs, the spacer elements 21 and the coupling member 22 are removed.

The threaded portion of each drill rod which has failed is cut off. Because the threaded portion of the drill rod which was within the spacer elements 21 will still be usable, the length of the reduced diameter portion 9 of the drill rods when abutted against each other will equal ⅔ L. One of the spacer elements 21 or 30 is then cut in half. Each half is threaded onto the reduced diameter portion until it engages the shoulder 12. The two rods are then joined together by using the coupling member 22 as before. The other spacer element is kept for later use. Thus, it can be seen that the drill rod can fail at the threaded portion within the coupling, where most rod failures occur, and the drill rod is still useful. The embodiment of FIG. 2 provides the advantage that should the coupling member 22 fail along with the threads 10 on the drill rod, one of the spacer elements can be used as the coupling member while the other spacer element is cut in half to form the new spacer elements. If desired, the threaded portion of the rod could be longer than three times the length of the spacer elements and coupling member. In such a case however, the spacer elements would have to be longer or more than one spacer element could be threaded onto each drill rod.

It is apparent from the foregoing that the objects of this invention have been carried out. A drill rod coupling system has been provided which increases the life of the drill rod and coupling beyond that provided by conventional drill rods and couplings. The rod need not be returned to the shop for reconditioning should thread failure occur. The operations of squaring off the drill rod and cutting one of the coupling parts in half can be accomplished with tools available in the field.

I claim:
1. In combination, a pair of coaxially aligned drill rods each having an unthreaded portion of substantially constant diameter throughout its length, a threaded portion at one end and means defining a stop between said threaded portion and said unthreaded portion, and a coupling for connecting the drill rods to each other; said coupling including a pair of spacer elements each secured to the threaded portion of one of the drill rods and a tubular coupling member threadedly secured to the threaded portion of each of said drill rods so that an end of one drill rod is in abutment with an end of the other drill rod; said stop and said spacer elements being adapted to prevent said drill rods from unthreading themselves from said coupling member; said spacer elements being substantially identical in size and shape to said coupling member.

2. The combination of claim 1 wherein said spacer elements are threadedly secured to said threaded portion and said coupling member abuts each of said spacer elements.

3. The combination of claim 2 wherein said spacer elements are shorter than the length of the threaded portion of said rod.

4. The combination of claim 1 wherein said stop is defined by a shoulder at the end of said threaded portion and said spacer elements abut said shoulders.

5. The combination of claim 1 wherein said spacer elements are non-metallic.

6. The combination of claim 1 wherein said drill rods have a maximum diameter at least as large as the outside diameter of said coupling member and said spacer elements.

7. The combination of claim 1 wherein the internal threads on said coupling member are continuous throughout the length of the coupling member.

References Cited

UNITED STATES PATENTS

| | | | |
|---|---|---|---|
| 735,030 | 7/1903 | Campbell | 287—117 |
| 756,476 | 4/1904 | Connolly et al. | 287—125 X |
| 1,064,764 | 6/1913 | Parker | 287—117 |
| 1,326,259 | 12/1919 | Gunn et al. | 287—125 X |
| 1,538,093 | 5/1925 | Dale | 287—117 |
| 2,045,520 | 6/1936 | Davison | 285—333 X |
| 3,201,158 | 8/1965 | Meripol | 287—117 |

REINALDO P. MACHADO, Primary Examiner

A. V. KUNDRAT, Assistant Examiner

U.S. Cl. X.R.

285—390